United States Patent [19]

Riederer

[11] Patent Number: 5,359,474
[45] Date of Patent: Oct. 25, 1994

[54] SYSTEM FOR THE SUB-MICRON POSITIONING OF A READ/WRITE TRANSDUCER

[76] Inventor: Thomas P. Riederer, 1215 Tunnel Rd., Santa Barbara, Calif. 93105

[21] Appl. No.: 947,146

[22] Filed: Sep. 18, 1992

[51] Int. Cl.⁵ ............................................. C11B 5/596
[52] U.S. Cl. ............................. 360/78.05; 360/109; 360/77.03
[58] Field of Search ................. 360/75, 78.12, 97.02, 360/105, 77.08, 78.06, 78.05, 109, 77.02, 77.03; 369/43; 310/328, 8.2; 188/72.2; 200/172 A

[56] References Cited

U.S. PATENT DOCUMENTS

| | | | |
|---|---|---|---|
| 3,924,268 | 12/1975 | McIntosh et al. | 360/78.05 |
| 4,816,942 | 3/1989 | Tanishima et al. | 360/78.12 |
| 4,858,040 | 8/1989 | Hazebrouch | 360/78.05 |
| 4,959,740 | 9/1990 | Nishikawa | 360/106 |
| 5,062,019 | 10/1991 | Morisawa | 360/106 |
| 5,084,791 | 1/1992 | Thanos et al. | 360/77.04 |
| 5,124,867 | 6/1992 | Kitahori et al. | 360/105 |

*Primary Examiner*—Aristotelis Psitos
*Assistant Examiner*—James T. Wilson

[57] ABSTRACT

A system for the sub-micron positioning of a read/write transducer (28) of a disk drive whereby motion of the transducer, fixed to a transducer holder (30), is caused by a flexing beam (26) deflected by an input spring (32) in turn deflected by an input actuator (34). Motion of the transducer is significantly less than the deflection of the input spring, significantly increasing system resolution while decreasing positioning errors and inaccuracies. The geometry and materials of the flexing beam (26) are such as to promote bending only in a preferred plane parallel to the disk (14) and keep mechanical vibration resonant frequencies higher than the disk rotational frequency.

13 Claims, 4 Drawing Sheets

SYSTEM FOR THE SUB-MICRON POSITIONING OF A READ/WRITE TRANSDUCER

BACKGROUND

1. Field of the Invention

This invention relates to dynamic magnetic information storage and retrieval devices, specifically to the positioning of a read/write transducer used within such devices.

2. Discussion of Prior Art

Dynamic magnetic information storage and retrieval devices of the type commonly referred to as hard disk drives can be composed of rotating flat magnetic disks with scanning transducers which read and write data in the form of magnetic transitions in concentric circular recording tracks on the disks. The transducers, mounted to flat sliders, "fly" a microscopically small distance above the surface of the respective disk on a thin, self-pressurizing bearing of ambient atmospheric air.

During the manufacturing process of a disk drive it is desirable to determine the electromagnetic performance of a transducer as it flies above a written magnetic track on a disk. It is desirable that this be done both as it is held in perfect alignment with a respective track and as it is held a small known radial distance away from alignment, on the order of 0.025 to 25 microns, simulating operation in a typical imperfect environment.

Heretofore, in a transducer or disk or disk drive test system, elaborate and expensive means were involved in moving the transducer a small known distance from perfect alignment with a respective track.

Test systems containing mechanisms consisting of precision linear ball- or roller-bearing slides and lead-screws have been used for positioning the transducer. These devices suffer from a problem known in the art as "stick-slip", whereby the actuation force in the positioning system increases until it is just sufficient to overcome friction. As friction is overcome the carriage of the positioning system suddenly moves, typically in an oscillatory manner, limited by the interaction between the compliance of the actuation means, the mass of the carriage and the friction opposing carriage motion. This phenomenon creates a limit to the minimum size that a positioning system can reliably move, such size being greater than desirable in even the most precise mechanisms of this kind.

Such devices also contain hysteresis such that movements in opposite directions create positioning errors. Compliance of the structural members within the system causes deformation when acted upon by the frictional forces. Since the frictional force acts in the direction opposing motion, this deformation is not the same for motions in opposite directions, resulting in positioning inaccuracies.

Mechanisms consisting of air bearing slides eliminate the friction and hysteresis problems due to the elimination of contact between moving surfaces by the air film, but are prohibitively expensive and require pressurized, filtered, dried air. These air compression and filtration systems are large, bulky and expensive. They require significant effort to install and maintain. High pressure air lines must be installed from the air compression system to the transducer test system, increasing the effort required to install or relocate the transducer test system.

Mechanisms employing some type of flexure pivot device as a secondary positioner on a primary gross positioner have been used to eliminate the friction and hysteresis of the transducer support means. All such mechanisms heretofore known have had the secondary positioner driven directly by some type of actuation means whereby the resolution and accuracy of the transducer positioning is limited to approximately that of the actuation means. Actuation means having sufficient resolution and accuracy, on the order of 0.025 micron, are prohibitively expensive.

Movement devices employing the electrostriction of piezoelectric crystals have also been utilized as secondary positioners. However, they suffer from a problem known in the art as creep, whereby the crystal continues electrostricting long after the driving signal has been applied, making accurate control of position difficult to achieve. These devices also require a high electrical voltage for operation, which requires additional means to ensure operator safety and adds considerably to the cost of a system. Additionally these devices require that the electrical input voltage remain applied for the crystal to remain expanded. This may be incompatible with the low-level electrical signals which are being measured from the transducer. Such devices also exhibit poor repeatability, whereby a given applied voltage produces a different movement size from one day to the next, making controlled accurate motion difficult.

All of the positioning means heretofore known suffer from one or more of the following disadvantages:

(a) The resolution of the transducer motion is limited to that of the positioning actuator. Positioning actuators with sufficient resolution, approximately 0.025 micron, are prohibitively expensive.

(b) The positional errors and inaccuracies of the transducer positioning actuator appear at the transducer on an approximately one-for-one basis. The addition of heretofore used mechanisms to reduce errors has not been successful, either in feasibility or cost effectiveness.

(c) Friction between moving parts in the positioning apparatus prevents the successful implementation of very small incremental movements. Means to eliminate the friction, such as the use of air bearings, are prohibitively expensive.

(d) Hysteresis in the positioning apparatus causes bidirectional positioning to be inaccurate. Means of eliminating the hysteresis are prohibitively expensive.

(e) The various subsystems must be carefully aligned for operation to be successful and accurate. The alignment of the transducer to the disk is dependent on these subsystem alignments and must be carefully controlled. Significant manufacturing time must be spent on this alignment procedure. The manufacturing tolerances on individual parts must be quite small which increases their costs significantly.

(f) The sizes of typical transducer test systems are large due to the required subsystems and their ancillary equipment. The large required space for these systems adds significantly to the cost of the entire manufacturing operation.

(g) The moving elements of the transducer positioning system have limited life due to wear of interfaces between moving parts. Because usage of a typical test system in a manufacturing situation is high, wear can occur quickly. Because tolerance for misalignment is low a small amount of wear can render a system useless.

(h) The moving elements of the transducer positioning system require lubrication for operation. The lubricant, upon migration, can cause contamination of the transducer's slider to disk interface unless it is carefully sealed inside the moving element. The sealing system adds expense and complexity to the overall cost.

(i) Vibration of the transducer causes inaccurate positioning and measurement errors. This vibration, induced by imbalance in the rotating disk spindle or other sources, can be amplified by mechanical resonances in the transducer support structure.

(j) The transducer positioning system is heavy in weight such that rapid positioning of the transducer requires significant power. This in turn requires the use of larger, more expensive motors and amplifiers, as well as more input power.

(k) The transducer positioning system is structurally compliant such that a rapid positioning movement of the transducer causes structural oscillations to occur in the system itself and in the supporting structure. This in turn requires additional settling time which in turn reduces throughput and increases the cost to manufacture the transducer, disk or disk drive.

OBJECTS AND ADVANTAGES

Accordingly, several objects and advantages of the present invention are:

(a) To provide a transducer positioning system with a resolution of transducer motion which is significantly higher than that of the positioning actuator, thus enabling use of a less costly positioning actuator.

(b) To provide a transducer positioning system where the errors and inaccuracies of the positioning actuator appear at the transducer on a significantly reduced level.

(c) To provide a transducer positioning system whereby friction in the system due to contact between moving parts is eliminated such that sufficiently small incremental moves are easily realized.

(d) To provide a transducer positioning system whereby hysteresis in the system is reduced such that sufficient accuracy of bidirectional motion is achieved.

(e) To provide a transducer positioning system whereby alignment and accuracy are inherent in the design such that laborious alignment procedures and expensive components with close manufacturing tolerances are eliminated.

(f) To provide a transducer positioning system which is small in both the size of the system itself as well as the size of any required ancillary equipment.

(g) To provide a transducer positioning system whereby wear of moving parts is confined to those which do not directly impact the ability of the system to perform accurately and reliably.

(h) To provide a transducer positioning system whereby lubrication is not required in areas where it may migrate to contaminate the transducer's slider to disk interface.

(i) To provide a transducer positioning system in which the mechanical vibration resonances affecting the transducer measurement accuracy are of sufficiently high frequency to avoid excitation by the rotating disk spindle.

(j) To provide a transducer positioning system which is light in weight such that rapid movement of the transducer may be achieved using minimal power.

(k) To provide a transducer positioning system which is structurally stiff such that rapid movement of the system occurs without significant structural oscillation.

Further objects and advantages of this invention are to provide a transducer positioning system which will accurately position the transducer a small known distance from perfect track alignment, which is inexpensive to manufacture and which obviates the need for a compressed filtered air supply.

Still further objects and advantages will become apparent from a consideration of the ensuing description and drawings.

SUMMARY OF THE INVENTION

The invention provides a system for submicron positioning of a transducer. An flexible beam is attached to a holder of a transducing element. A input spring causes the flexible beam to move the transducer in a direction parallel to the disk surface. The input spring is attached to the holder in a manner that the deflection of the spring is greater than deflection of the transducer. The deflection of the holder is determined by position detecting means, such a linear variable differential transformers.

Figure 1:
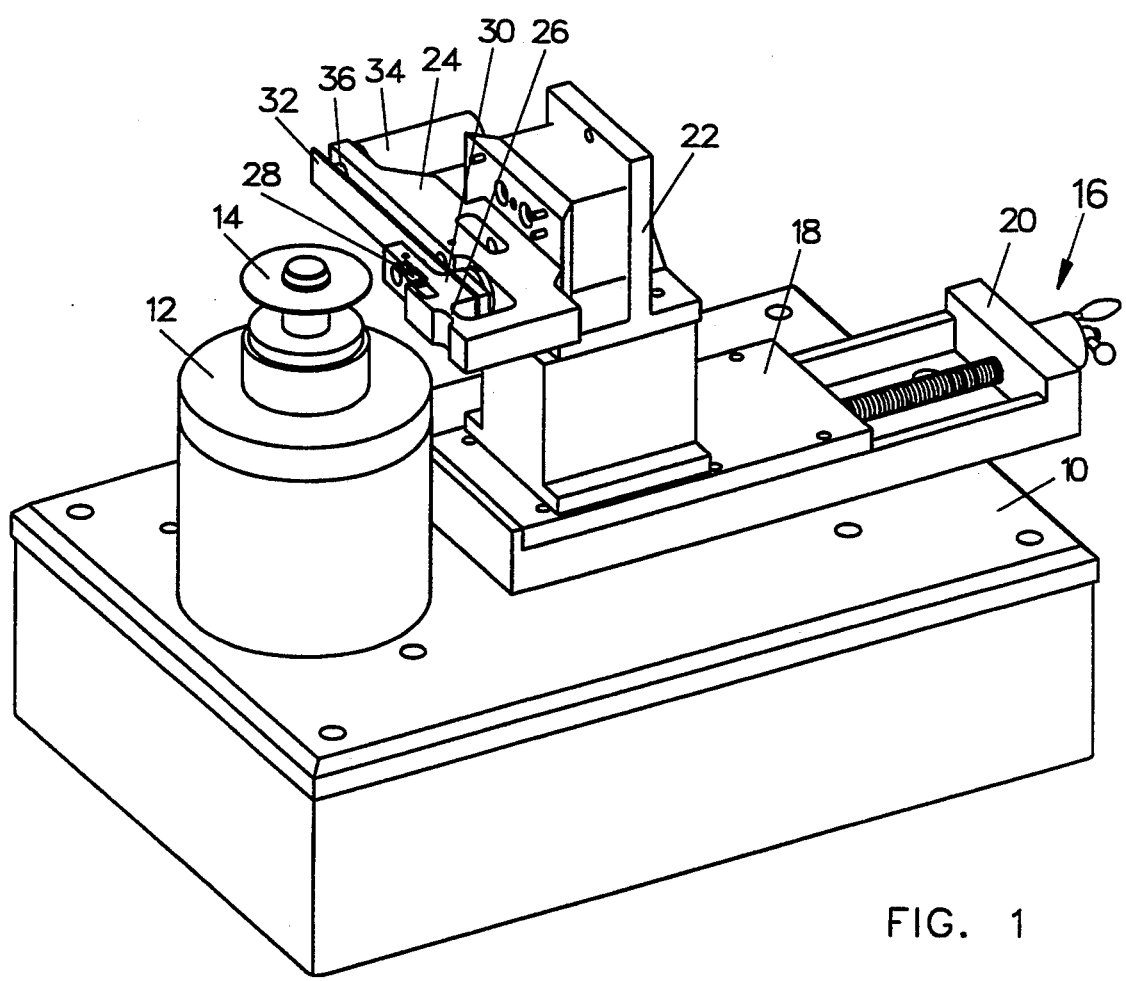
FIG. 1 shows a perspective view of the preferred embodiment of the present invention.

LIST OF REFERENCE NUMERALS 10 base
12 motorized spindle
14 magnetic disk
16 gross positioning stage
18 carriage of stage
20 foundation of stage
22 support member
24 positioner frame
26 flexing beam
28 transducer
30 transducer holder
32 input spring
34 input actuator
36 output member of input actuator
38 non-intrusive displacement sensor
40 coil
42 core
44 post
46 electrical conversion circuit
48 system controller
50 display readout device

DESCRIPTION OF INVENTION

A perspective view of the preferred embodiment of the present invention is shown in FIG. 1. A rigid base 10 consisting of a flat plate of inflexible material supports the other components of the system nonmovably. In the preferred embodiment the base consists of an aluminum plate fixedly attached to a granite surface plate. However the base could be constructed of any material possessing sufficient rigidity to prevent relative motion between fixedly attached components on the order of magnitude of that motion intended by the invention, typically sub-micron.

Near one end of and fixedly attached to base 10 is a motorized spindle 12 which provides the means necessary to rotate a magnetic disk 14 about its centroidal axis. Rotatably attached to the rotor of spindle 12 is a magnetic disk 14. In the preferred embodiment a single disk is used; however in alternative embodiments a plurality of such disks may be used. The diameter and thickness of such disks is as is common to the art, being 25 to 250 mm in diameter typically, although the size is generally irrelevant to the operation of the invention.

Near the other end of and fixedly attached to base 10 is a gross positioning stage 16. The carriage 18 of the stage is translatably attached to a foundation 20 of the stage, allowing controlled motion along the longitudinal axis of stage 16 which is parallel to the plane of disk 14.

Arising from and fixedly attached to carriage 18 is a support member 22 which rigidly secures a positioner frame 24. The support member may have means to precisely secure positioner frame 24 in a variety of positions to accommodate such alternatives as varying transducer heights or varying disk diameters or thicknesses without requiring time-consuming alignment.

Fixedly attached to positioner frame 24 in a cantilevered manner is a flexing beam 26, to the free end of which is fixedly attached a rigid transducer holder 30. Features on the transducer holder such as bosses, holes and slots are provided to removably receive and precisely register a transducer 28 for reading and writing magnetic transitions on disk 14.

The extents of the motion of carriage 18 of gross positioning stage 16 are such as to allow transducer 28 to overlap and fly over (or under) disk 14 above (or below) any of a plurality of concentric recording tracks located on the flat surfaces of the disk.

The dimensions of beam 26 are such as to promote bending in a plane parallel to that of disk 14 (the preferred plane) and to resist bending in other planes. The dimensions of the beam combined with the properties of the material of which the beam is constructed are such that it remains in what is known in the art as fully elastic bending when its deflection is sufficient to allow transducer 28 to be moved from a previously-written track by the desired amount of misalignment. In the preferred embodiment beam 26 is constructed of aluminum alloy, although any material having sufficient strength and rigidity to remain fully elastic yet resist bending in the non-preferred plane can be used, such as steel, stainless steel, cast iron, fiberglass, etc.

The stiffness of beam 26 in the preferred plane is sufficiently high such that the fundamental mechanical resonant frequency of vibration of transducer 28, transducer holder 30 and beam 26 acting together is higher than that which could be excited by imbalance forces of rotating spindle 12 and disk 14 at typical operating speeds.

In the preferred embodiment there is a single flexing beam, the bending of which causes transducer holder 30 and henceforth transducer 28 to move in a generally circular arc in the preferred plane generally radial to disk 14. In alternative embodiments there may be a plurality of flexing beams arranged in such manner as to produce an alternative desired motion of the transducer holder and transducer.

Fixedly attached to transducer holder 30 is an input spring 32. The stiffness of this spring is many times lower than that of the flexing beam 26. The nature of the spring is such that the direction of its engendered spring force causes bending of beam 26 predominantly in the preferred plane.

In the preferred embodiment input spring 32 is a thin cantilevered beam, the fixed end of which is fixedly attached to transducer holder 30. The spring may be of a different type in alternative embodiments provided it may be repeatedly compressed and relaxed without permanent deformation and provided there is little internal friction between any moving elements of the spring.

Figure 2:
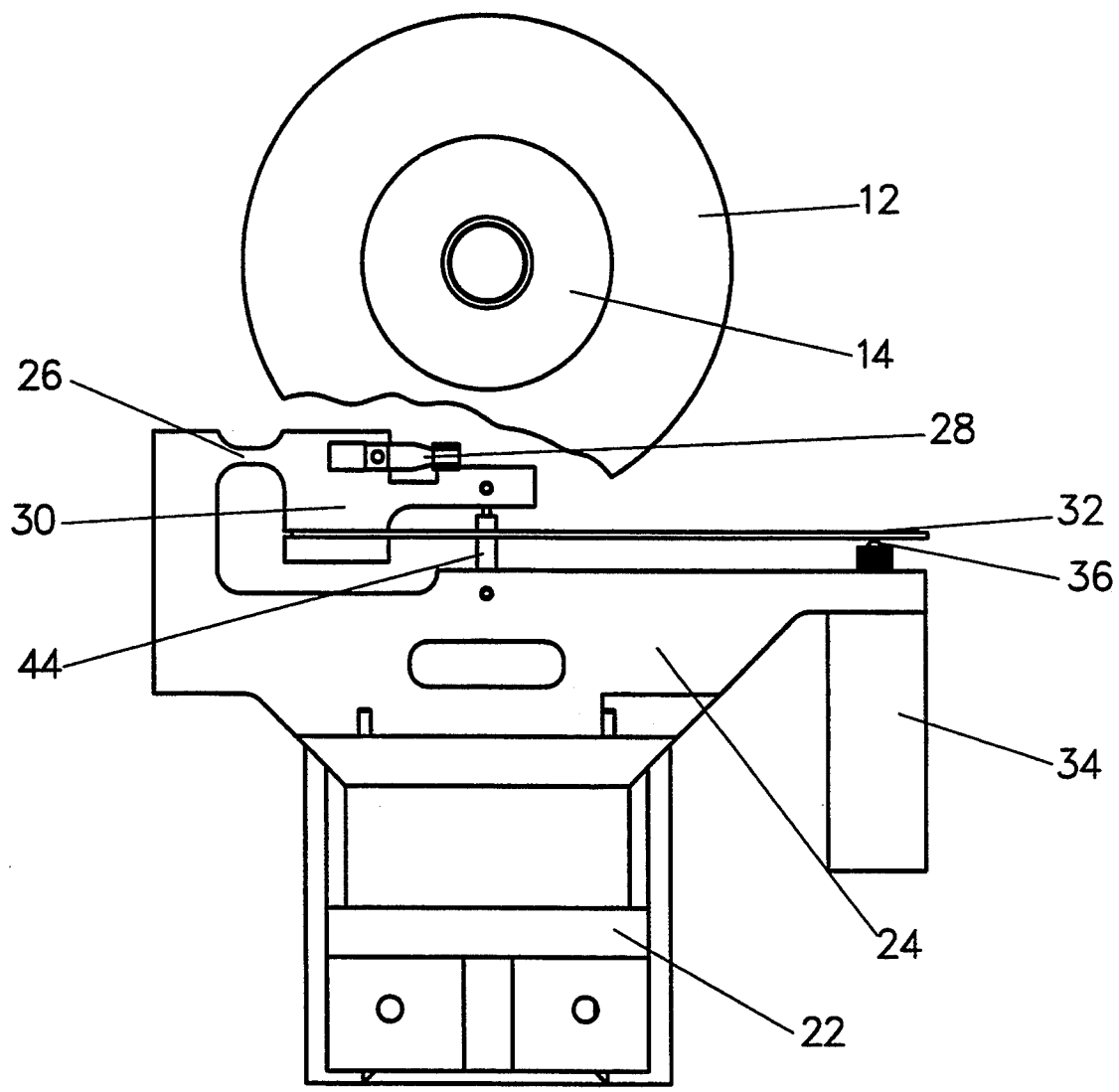
FIG. 2 shows a plan view of the preferred embodiment of the present invention.

An input actuator 34 is fixedly attached to positioner frame 24 such that the output member 36 of actuator 34 presses upon the side of input spring 32 near the end opposite that secured to transducer holder 30. In the preferred embodiment the input actuator is a linear motor-driven leadscrew device; however other types such as cams or voice-coil actuators can be used in alternative embodiments, provided they have travel and resolution approximately 100 times that of the desired misalignment. The input actuator of the preferred embodiment and its mounting are more clearly shown in the plan view of FIG. 2 and the exploded view of FIG. 3.

Figure 3:
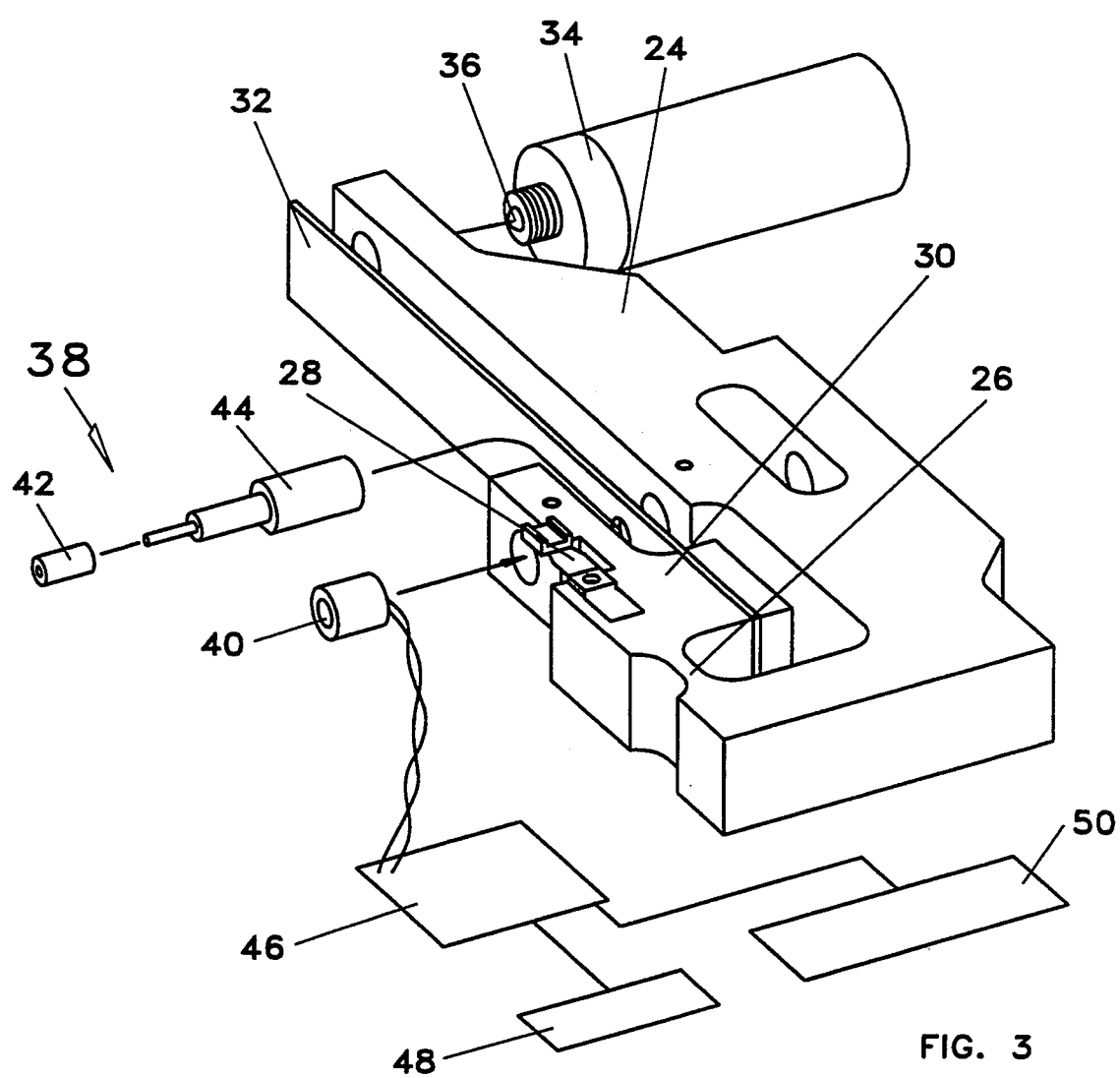
FIG. 3 shows an exploded view of a positioner frame showing components of a non-intrusive displacement sensor mounted in the frame and transducer holder.

A non-intrusive displacement measuring sensor 38 is fixedly attached to positioner frame 24, support member 22 or carriage 18 such as to be able to measure the displacement of transducer 28 or transducer holder 30. In the preferred embodiment the sensor is a linear variable differential transformer, consisting of an annular coil 40 which is fixedly attached to transducer holder 30 and a cylindrical core 42 which is fixedly attached to a post 44 on positioner frame 24 such that the core is suspended inside the annulus of the coil without contacting it. FIG. 3 is an exploded view of the preferred embodiment showing the linear variable differential transformer components and their mounting. An electrical conversion circuit is provided to convert the sensed displacement into a compatible electrical signal whereby such signal can be monitored by a system controller 48 or sent to a display readout device 50.

In alternative embodiments any type of displacement measuring device such as a laser interferometer, capacitance or inductance sensing device or optical reflectance device can be used provided such device is non-intrusive to the movement of the transducer and capable of resolving the desired misalignment to the desired accuracy. In certain applications the output of the transducer itself may be used for monitoring its position, rather than the actual displacement.

Figure 4:
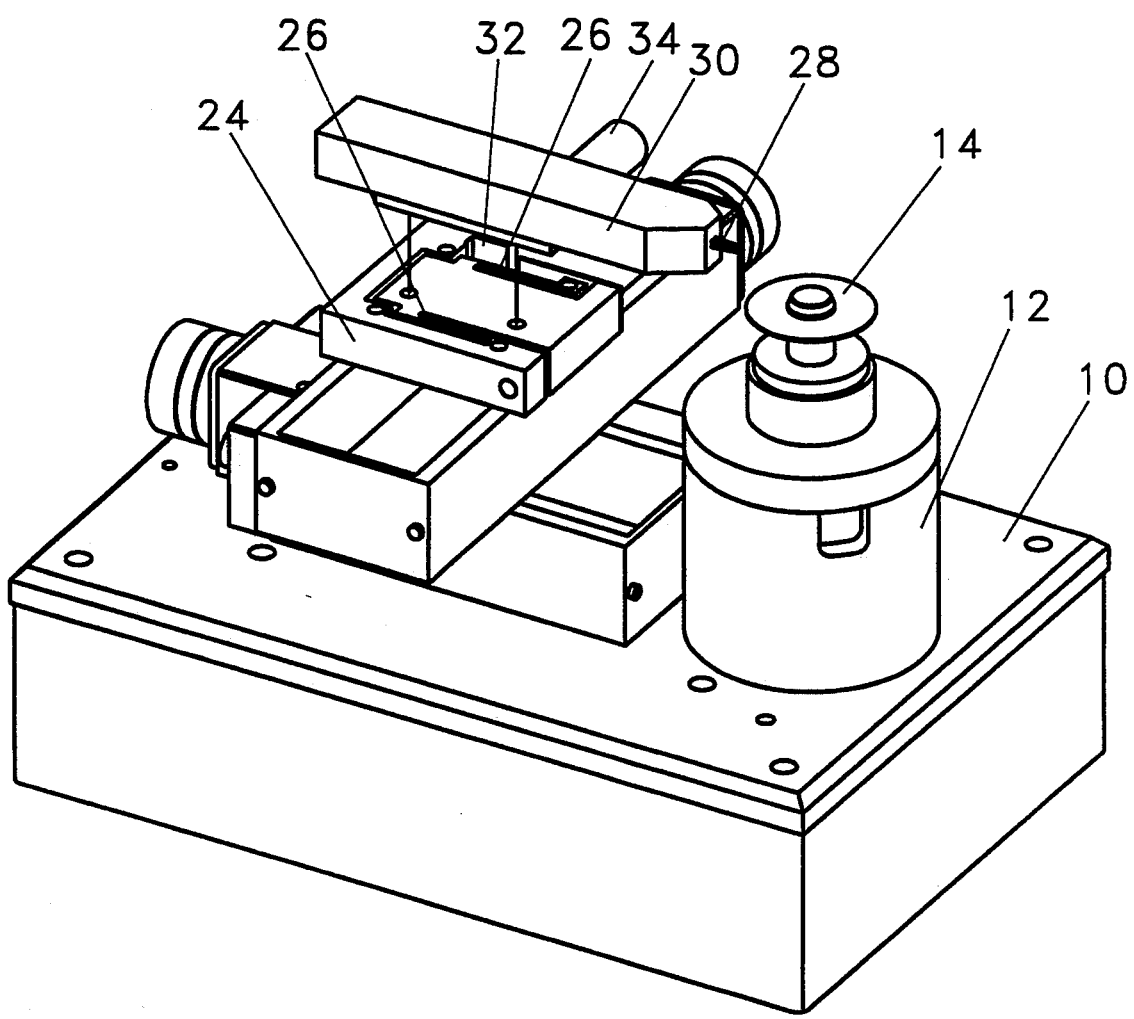
FIG. 4 shows a perspective view of an alternative embodiment of the present invention.

A perspective view of an alternative embodiment of the present invention is shown in FIG. 4. In this embodiment transducer holder 30 is suspended within positioner frame 24 by a pair of identical restraining cantilever flexing beams 26 to assure generally linear translation in the desired direction within the preferred plane. In additional alternative embodiments nonidentical flexing beams could be used to assure transducer 28 moves along a desired path which is not necessarily linear.

OPERATION OF INVENTION

There are several modes of operation of the present invention.

In precursory steps, motorized spindle 12 rotates magnetic disk 14 at the desired speed. Gross positioning stage 18 is used to position transducer 28 at the desired radial and tangential location on the disk, with the transducer flying a microscopically small distance above the disk in a stable manner. The gross positioning stage henceforth holds its carriage stationary.

Means are used to cause transducer 28 to write magnetic transitions on the surface of disk 14. Because the transducer is held stationary over the rotating disk the generated recorded track is a circular annulus, concentric with the disk and radially aligned with the transducer.

In a mode of operation known in the art as offtrack testing, electrical performance test measurements are made when the transducer has been moved out of perfect alignment with the written track by a small known radial distance. The transducer is moved this small distance in the following manner:

Means are used to cause output member 36 of input actuator 34 to compress input spring 32. This in turn applies a load to flexing beam 26, causing it to bend wherein transducer holder 30 and hence transducer 28 are caused to move. The displaced motion of the transducer holder is sensed by non-intrusive displacement sensor 38, converted to an electrical signal by electrical conversion circuit 46, and sent to display readout device 50. If the displaced motion is other than that desired, input actuator 34 is operated to change the initial compression of input spring 32 and hence the bending of flexing beam 26 and displacement of transducer 28. This procedure can be repeated until the desired transducer-to-track misalignment, which in this case is equal to the transducer displacement, is achieved.

In a mode of operation known in the art as a closed loop servo, the electrical signal from electrical conversion circuit 46 is sent to system controller 48. The system controller thereby adjusts input actuator 34 through appropriate means until the desired transducer misalignment is achieved.

In a further mode of operation the electrical output signal of transducer 28 is read while the invention is moving the transducer across a track. This method is used to locate the transducer at a desired electrical position, such as the point of maximum output signal, rather than a spatial position.

The ratio of the deflection of flexing beam 26 to that of input spring 32 is approximately proportional to the ratio of the stiffness of the input spring to that of the flexing beam. Hence the ratio of transducer motion to input actuator motion is approximately equal to the stiffness ratio. In the preferred embodiment this ratio is approximately 1:100 although in alternative embodiments it can vary from 1:1 to at least 1:1000, the limit of which has not been determined experimentally.

In a further mode of operation input actuator 34 is moved a known amount and transducer 28 is assumed to move the amount accorded by the stiffness ratio, such ratio being sufficiently known and constant to assure positioning within the desired accuracy. This method requires knowledge of the input actuator displacement rather than measurement of the transducer position.

From the aforementioned description and modes of operation it can be seen that the present invention has certain advantages over the prior art:

(a) Because of the motion reduction the resolution of input actuator 34, as applied to motion at transducer 28, is far greater than the actuator alone. Thus a common quality actuator having a resolution of 1 micron gives a resolution of approximately 0.01 micron at the transducer position in the preferred embodiment and potentially even better resolution in additional embodiments.

(b) In the same manner the errors and inaccuracies of input actuator 34 are attenuated by the stiffness ratio and appear at transducer 28 on a significantly reduced level.

(c) It can be seen that there are no moving contacting parts between transducer holder 30 and positioner frame 24 save for input actuator 34 and input spring 32. The minimum step size established by the stick-slip phenomenon of the friction of this interface is reduced by the stiffness ratio such that sufficiently small incremental moves of transducer 28 are easily achieved. Note that because the transducer flies above disk 14 on a thin layer of air its movement is generally frictionless.

(d) Similarly since the friction force is attenuated by the stiffness ratio the hysteresis of transducer motion is also attenuated. Therefore sufficient accuracy of bidirectional motion can be achieved.

(e) In typical embodiments positioner frame 24, flexing beam 26 and transducer holder 30 are machined from a single body of material. The flexing beam is simply a necked-down portion of the material between the positioner frame and the transducer holder. Because of this the alignment and accuracy of the system are inherent and the need for laborious alignment procedures and expensive components with close manufacturing tolerances is eliminated.

(f) Because there is no need for compressed air or high voltage and because of the compactness of the positioner design the system size can be smaller than those of the prior art.

(g) Because transducer motion is determined by fully elastic bending of flexing beam 26 and because inaccuracies due to wear of input actuator 34 are attenuated by the stiffness ratio the system is quite impervious to wear.

(h) Because flexing beam 26 requires no lubrication and input actuator 34 may be remotely located from transducer 28, the transducer's slider to disk interface is protected from lubricant contamination.

(i) Because flexing beam 26 is made sufficiently stiff such that the fundamental mechanical vibration resonant frequency of transducer 28, transducer holder 30 and beam 26 is significantly higher than the spindle rotational frequency, the disk imbalance forces do not significantly affect transducer positioning accuracy.

(j) Because transducer 28, transducer holder 30, input spring 32 and input actuator 34 are the only objects which move, the power required to position the transducer is minimal.

(k) Because of the rigidity of flexing beam 26, transducer 28 may be rapidly positioned without significant structural oscillation.

CONCLUSION, RAMIFICATIONS AND SCOPE OF INVENTION

Accordingly, it can be seen that the invention can be used to accurately position a transducer over a recorded track with a small known radial misalignment. Further it can be seen that the positioning system described herein is of significantly lower cost than those of the prior art and requires none of the ancillary equipment, such as a compressed filtered air supply, required by some of the prior art systems.

The invention has solved many of the technical problems associated with sub-micron positioning of the transducer in the prior art in that it significantly increases transducer positioning resolution using only common quality components through the use of flexing beams with input springs;

it significantly reduces errors and inaccuracies due to reduced friction and hysteresis;

it is much easier to construct, align, move and maintain;

it is less susceptible to wear, vibration and transducer slider to disk contamination than prior art systems.

Although the description above contains many specificities, these should not be construed as limiting the scope of the invention but as merely presenting some of the present embodiments of the invention.

Thus the scope of the invention should be determined by the appended claims and their legal equivalents, rather than by the examples given.

I claim:

1. A device for moving a read/write transducer variable distances of approximately or less than a micron relative to a rotating information storage recording disk comprising:
   (a) a holder for securing said transducer,
   (b) locating means for locating said holder whereby previously recorded information may be read from one of a plurality of concentric circular recording tracks on said disk by said transducer,
   (c) a beam which flexibly attaches said holder to said locating means,
   (d) a compliant input spring, the stiffness of which is significantly less than that of said beam, one end of which is fixedly attached to said holder,
   (e) input means for providing a force against the free end of said compliant input spring whereby said force urges a deflection of said spring which in turn urges a deflection of said beam, whereby the ratio of said deflections is substantially equal to the ratio of the respective compliances of said spring and said beam,
   (f) whereby said deflection of said beam causes a movement of said holder and henceforth said transducer in a direction substantially parallel to the plane of said disk.

2. The device of claim 1, further including a gauging means for measuring said movement of said holder whereby said movement of said transducer with respect to said disk is deduced.

3. The device of claim 2, wherein said gauging means is a device selected from the group consisting of linear variable differential transformers and laser interferometers and optical encoders and variable capacitance sensor systems and variable inductance sensor system and laser holographic encoders.

4. The device of claim 2, wherein said gauging means is the electrical output signal of said transducer, whereby successful positioning of said transducer is determined by a characteristic of said signal rather than by a spatial position of said transducer with respect to said disk.

5. The device of claim 2, further including a system controller which accepts the output signal of said gauging means, compares said signal to a desired position reference, computes an error signal and further urges said input means to respectively adjust said force on said spring to achieve said desired position, whereby a closed loop system results.

6. The device of claim 1, wherein said movement of said transducer is substantially radial to said disk.

7. The device of claim 1, further including additional beams flexibly connected to said holder whereby the kinematics of the motion of the plurality of said beams assures said movement of said holder and henceforth said transducer substantially in a desired direction.

8. The device of claim 1, wherein said compliant input spring is a leaf spring cantileveredly attached to said transducer holder.

9. The device of claim 1, wherein said locating means is a positioning stage whereby said holder is positioned substantially parallel to said disk.

10. A method for moving a read/write transducer variable distances of approximately or less than a micron relative to a rotating information storage recording disk comprising:
   (a) clamping said transducer in a holder flexibly attached by a beam to a means for locating said holder whereby previously recorded information may be read from one of a plurality of concentric circular recording tracks on said a disk surface of disk by said transducer,
   (c) applying a force against the free end of a compliant input spring fixedly attached to said holder,
   (d) whereby a deflection of said spring urges a deflection of said beam,
   (e) whereby the ratio of said deflections is substantially equal to the ratio of the respective compliances of said spring and said beam,
   (d) whereby said deflection of said beam causes a movement of said holder and henceforth said transducer substantially parallel to the place of said disk surface.

11. The method of claim 10, further including measuring said movement of said holder whereby said movement of said transducer with respect to said disk is deduced.

12. The method of claim 10, whereby said movement of said transducer is radial to said disk.

13. The method of claim 10, further including additional beams flexibly connected to said holder whereby the kinematics of the motion of the plurality of said beams assures said movement of said holder and henceforth said transducer substantially in a desired direction.

* * * * *